United States Patent
Loncar et al.

(10) Patent No.: US 12,492,015 B2
(45) Date of Patent: Dec. 9, 2025

(54) SYSTEM AND METHOD FOR THE IMPROVEMENT OF ATTITUDE CONTROL SYSTEM TESTBEDS FOR SMALL SATELLITES

(71) Applicants: Josip Loncar, Zagreb (HR); Bojan Igrec, London (GB); Dubravko Ivan Babic, Milpitas, CA (US)

(72) Inventors: Josip Loncar, Zagreb (HR); Bojan Igrec, London (GB); Dubravko Ivan Babic, Milpitas, CA (US)

( * ) Notice: Subject to any disclaimer, the term of this patent is extended or adjusted under 35 U.S.C. 154(b) by 327 days.

(21) Appl. No.: 17/994,038

(22) Filed: Nov. 25, 2022

(65) Prior Publication Data

US 2023/0227180 A1    Jul. 20, 2023

Related U.S. Application Data

(60) Provisional application No. 63/301,093, filed on Jan. 20, 2022.

(51) Int. Cl.
*B64G 1/28* (2006.01)
*B64G 1/36* (2006.01)
*G01C 19/02* (2006.01)
*G01M 99/00* (2011.01)

(52) U.S. Cl.
CPC ............ *B64G 1/285* (2013.01); *B64G 1/36* (2013.01); *G01C 19/02* (2013.01); *G01M 99/004* (2013.01)

(58) Field of Classification Search
None
See application file for complete search history.

(56) References Cited

U.S. PATENT DOCUMENTS

| | | | | |
|---|---|---|---|---|
| 6,382,565 B1* | 5/2002 | Fowell | .................. | B64G 1/244 244/165 |
| 6,681,649 B2* | 1/2004 | Hyde | ..................... | G01C 19/30 244/165 |
| 8,876,060 B2* | 11/2014 | Nagabhushan | ......... | F16F 15/30 244/164 |
| 10,202,208 B1* | 2/2019 | Sanyal | .................. | B64G 1/286 |
| 2012/0199697 A1* | 8/2012 | Nagabhushan | ........ | B64G 1/286 244/165 |
| 2012/0298430 A1* | 11/2012 | Schroll | ............... | B62D 55/075 180/9.1 |

(Continued)

*Primary Examiner* — Mark A Shabman
(74) *Attorney, Agent, or Firm* — Shalini Venkatesh (57) ABSTRACT

A rotational negative-inertia converter (RNIC) has a housing enclosing a flywheel configured to rotate around an axis of symmetry; a motor with a stator attached to the housing and a rotor attached to the flywheel to rotate it around the axis of symmetry; a housing angular accelerometer attached to said housing; a flywheel angular accelerometer; and a controller configured to receive measured accelerometer values from the accelerometers. The controller is configured to drive the motor to maintain the angular acceleration of the flywheel at a value proportional to the housing angular acceleration, with a predetermined proportionality constant.
A method for calibrating an ADCS testbed comprising a DUT holder with three RNICs includes: using measured angular velocities of the DUT holder and RNIC flywheels, and ZGT data, to compute moments of inertia of the DUT holder with and without a satellite with ADCS, allowing compensation for those moments by the RNICs.

4 Claims, 8 Drawing Sheets

(56) References Cited

U.S. PATENT DOCUMENTS

| | | | | |
|---|---|---|---|---|
| 2013/0125667 A1* | 5/2013 | Fitz-Coy | ................ | B64G 1/286 |
| | | | | 73/862.041 |
| 2016/0107769 A1* | 4/2016 | Verbin | ................... | B64G 1/286 |
| | | | | 244/165 |
| 2016/0137318 A1* | 5/2016 | Fitz-Coy | ................ | F16F 15/30 |
| | | | | 244/165 |

* cited by examiner

SYSTEM AND METHOD FOR THE IMPROVEMENT OF ATTITUDE CONTROL SYSTEM TESTBEDS FOR SMALL SATELLITES

CROSS REFERENCE TO RELATED APPLICATION

This application claims priority to U.S. Provisional Patent Application Ser. No. 63/301,093, entitled "SYSTEM AND METHOD FOR THE IMPROVEMENT OF ATTITUDE CONTROL SYSTEM TESTBEDS FOR SMALL SATELLITES", filed on 20 Jan. 2022, which is hereby incorporated by reference as if set forth in full in this application for all purposes.

FIELD OF THE INVENTION

Embodiments of the present invention relate to small satellites and, more particularly, to systems and methods for assessing the performance of the attitude determination and control systems present within small satellites.

BACKGROUND OF THE INVENTION

Nanosatellites have aroused a substantial interest in recent years. The number of launched nanosatellites in low Earth orbit grows exponentially year over year. Their applications range from scientific experiments in a space environment and Earth observation, such as monitoring of ozone depletion and climate changes, to providing global connectivity through broadband internet services.

The interest in these satellites is driven by the current constraints of traditional satellites and launch systems. As a result, there has been a significant effort to push satellite technology to smaller sizes and mass, which would enable small satellites to accomplish missions that complement those of larger satellites.

Consequently, the number of novel payload proposals requiring highly accurate pointing and satellite orientation control grows daily. The satellite system responsible for the stability and orientation of the satellite is known as the attitude determination and control system (ADCS). Thus, the presence of an ADCS is unavoidable in most of the modern missions that include, but are not limited to Earth observation, monitoring of light pollution, microwave and optical communication, etc.

ADCSs are one of the most challenging spacecraft subsystems for hardware performance verification and validation. Performing the design qualification and experimental verification of an ADCS sub-system prior to launch is of critical importance as it reduces mission failure. Finally, due to cost constraints, it must be done in Earth gravity.

Testing of ADCSs has traditionally been achieved using a motion platform that has three rotational degrees-of-freedom to emulate the spacecraft's attitude motion. The design of ADCS testbeds for spacecraft has been an active field of research and development for at least 60 years. From testbeds for large spacecraft (>500 kg) to more recently small and nano satellites, they all use suspension-based systems using air bearings. Furthermore, air-bearing spacecraft simulators for nanosatellites can nowadays be built by 3D printers.

Air bearings are fluid bearings that use a thin film of pressurized gas, usually air, to provide a low friction load-bearing interface between surfaces. The surfaces do not touch, thus using such bearings delivering (i) extremely low friction, (ii) very low wear relative to conventional bearings, and (iii) distinct advantages in precision positioning. The technology of air bearings is well documented in the industry as can be seen from publicly available literature, such as the book titled "Air Bearings Theory, Design and Applications" written by Farid Al-Bender and coworkers and published by John Wiley & Sons Ltd. in 2021. Air bearings are also known as aerostatic or aerodynamic bearings.

Conventional, large-satellite testbeds provide only limited means to validate 3-axis attitude control systems as some ADCS testbeds using air bearings have limited range of motion about the pitch and roll axes (about ±30°), rendering the tests of continuous large angle maneuvers impossible. These testbeds also have limits on their angular velocity, due to the dynamic capacity of the air bearing, thereby limiting rapid re-targeting maneuvers.

Nanosatellite ADCS verification can be made significantly simpler and has lately become a topic of interest and innovation. A nano satellite ADCS verification platform generally comprises a testbed of one of three types (tabletop, umbrella, and dumbbell), the testbed including a spherical air bearing. These types of verification testbeds are described in publicly available literature such as "Historical Review of Air-Bearing Spacecraft Simulators" written by Jana L. Schwartz and coworkers and published in Journal of Guidance, Control, and Dynamics in 2003. In all these systems, the testbed floats on an air film created by a stream of compressed air and provides low friction or ideally frictionless environment emulating a satellite state in orbit. In all three testbed types mentioned, rotational freedom is inherently limited.

Enabling three degrees of rotational freedom in the testbed so that a satellite can have complete freedom of rotation is desirable, but not simple for large satellites. The recent progress in nanosatellites, especially the CubeSat format, has spurred interest in developing ADCS testbeds that are substantially smaller than their small-satellite counterparts and allow 3D rotation, meaning rotation without any restriction in pointing. Such systems are well known in the art. An example is described in a publication by J. Prado-Molina and coworkers titled "Frictionless Spacecraft Simulator with Unrestricted Three-Axis Movement for Nanosats" published in the International Journal of Scientific & Technology Research in 2018.

Figure 1:
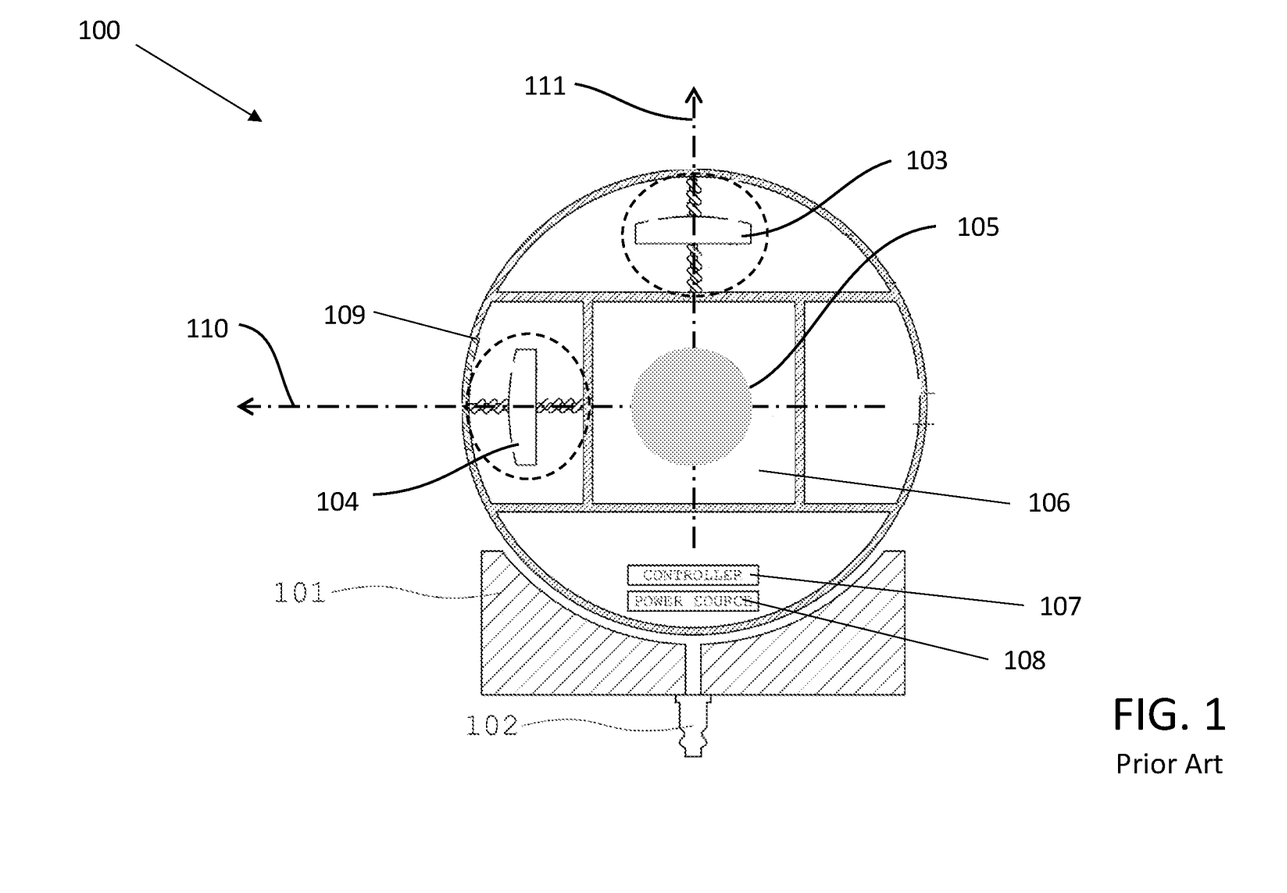
FIG. 1 (PRIOR ART) illustrates an air-bearing testbed used to characterize ADCS system for small satellites in which rotation in all directions is possible.

FIG. 1 shows an example of relevant prior art in which a testbed 100 comprises a spherical air bearing base 101 and a spherical device-under-test ("DUT") holder 109. The shown example is simplified for the purpose of illustrating only the essential elements of such a system and it is tailored for testing a 1 U (10 cm×10 cm×13.5 cm) CubeSat nanosatellite. The nanosatellite is not shown in FIG. 1, but the space where the nanosatellite will be positioned when loaded is cavity 106. The nanosatellite (device under test) is planned to be inserted into the cube-shaped cavity 106 located substantially in the center of the spherical holder 109. The terms nanosatellite and device under test (DUT) are being used interchangeably in this application. The air bearing between the spherical DUT holder 109 and the air bearing base 101 is realized by providing compressed gas through the pneumatic inlet 102.

To accurately mimic the mechanical conditions experienced by a satellite in space, a test system should satisfy several conditions. Besides allowing near-frictionless conditions, all parasitic torques that come from testbed imperfections should be minimized or ideally eliminated. Here, the greatest challenge is minimization of the gravitational torque, which appears due to the displacement of the center of mass with respect to the center of rotation of the testbed causing pendulum-like motion and restricting free rotation.

FIG. 1 shows three weight-centering modules 103, 104 and 105, that are used to minimize the gravitational torque. The concept of using balancing mass to eliminate gravitational torque is known in the art and described in publicly available literature such as "Automatic Mass Balancing of a Spacecraft Three-Axis Simulator: Analysis and Experimentation" written by Simone Chesi and coworkers and published in Journal of Guidance, Control, and Dynamics in 2014. If we define a rectangular coordinate system for the spherical DUT holder 109, we can refer to the x-axis 110, y-axis 111 and the z-axis (not shown, but pointing into the plane of FIG. 1). Since the center of mass of the entire assembly 100 has to be adjusted, one needs to be able to adjust each of the center of mass coordinates independently. For this reason, one generally uses one x-axis weight-centering module 104, one y-axis weight-centering module 103, and one z-axis weight centering module 105 (shown only by its shaded silhouette). Each of the weight-centering modules includes a weight and means for moving the weight towards and away from the center of the spherical holder with the intent to move the center of mass of the entire holder 109 along the respective axis.

Finally, the testbed 100 comprises a power source 108 and a controller 107 to perform the necessary adjustments and other functions.

Figure 2:
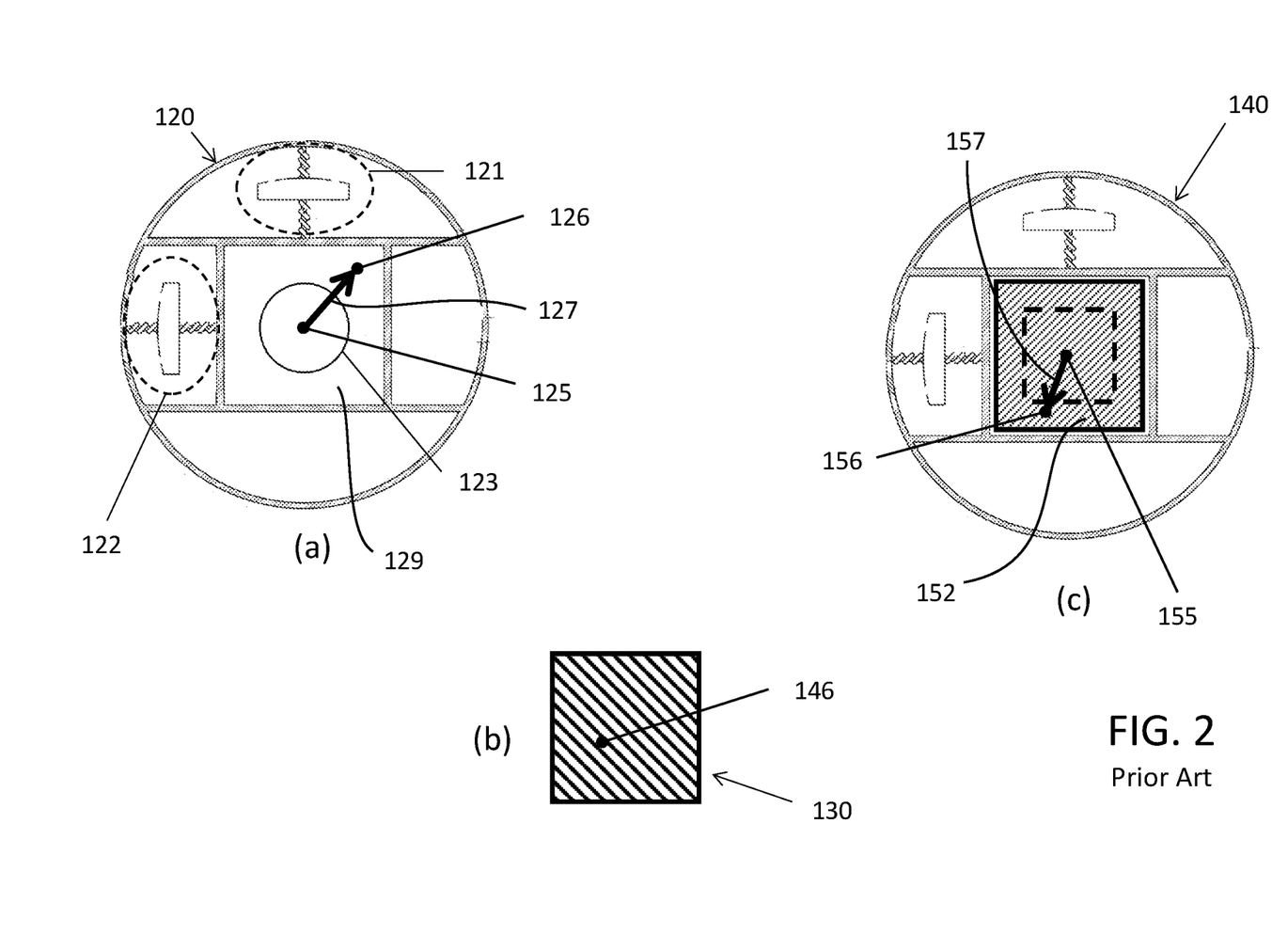
FIG. 2 (PRIOR ART) illustrates the adjustment of center of mass of the loaded testbed system.

FIG. 2. (Prior art) illustrates issues related to using the weight-centering modules (103, 104 and 105 in FIG. 1) to eliminate the gravitational torque when the device under test (satellite) is loaded into the holder 109. At the upper left of the figure, the unloaded spherical DUT holder 120 of an ADCS testbed illustrated in FIG. 1 is shown, with the x-axis weight-centering module 122, y-axis weight-centering module 121, and a silhouette of the z-axis weight-centering module 123. The spherical DUT holder 120 has not been loaded with the device under test (satellite), hence the space reserved for the device under test 129 is empty. The controller 107 and the power source 108 shown in FIG. 1 are not shown again in FIG. 2 to avoid cluttering the figure, but they should be present.

The unloaded spherical DUT holder 120 has been designed to have a substantially spherical shape with a well-defined location of the center of the sphere 125, also referred to as the rotation center, structure center point or geometric center point. The x, y, and z axes discussed in relation for FIG. 1 (axes 110, 111, and y-axis not shown) are all rotational axes and pass through the center of the sphere 125, 155) when the unloaded spherical DUT holder 120 or the loaded spherical DUT holder 140 is rotating on the air bearing as shown in FIG. 1(c).

The location of the center of mass 126 of the unloaded spherical DUT holder 120 will depend on the mass of all the elements that are included within the spherical DUT holder 120 and their locations relative to the center of the sphere. Inasmuch as the weight-centering modules are included in the list of components within the spherical DUT holder 120, the center of mass is generally adjustable using the three weight-centering modules. When there is a displacement 127 between the center of the sphere 125 and the center of mass of the unloaded spherical DUT holder 120, then there is a non-zero gravitational torque present. The unloaded spherical DUT holder is also characterized by having moments of inertia for rotation around any orthogonal axes of rotation. These moments exist, but do not necessarily have to be measured or known at this point, unless the method of adjusting the performance of the testbed requires this.

The satellite 130, shown in FIG. 2 prior to insertion into the testbed, may have a cubical shape, as in the case of a 1 U CubeSat, but any other nanosatellite shape is possible and will determine the ultimate size of the ADCS testbed, which must include a spherical holder large enough to hold a DUT of any likely size and shape. The details of the electronics and functions of the satellite 130 are not relevant to this application, hence they have been omitted from the discussion. The only exception is the satellite center of mass which is relevant to the ADCS testing. Nanosatellites have some general guidance on where relative to the geometric center of the satellite the center of mass of the satellite should be situated, and this is indicated for satellite 130 by an arbitrarily placed center of mass at location 146. The satellite is also characterized by having moments of inertia for rotation around three orthogonal axes of rotation. The moments exist, but do not necessarily have to be measured or known at this point, unless the method of adjusting the performance of the testbed requires this.

The satellite 130 is now inserted into the unloaded spherical DUT holder 120 and the result is illustrated at the upper right of FIG. 2 as the loaded spherical DUT holder 140, where the satellite 152 is a part of the holder 140. At this point the center of mass 156 of the assembly is a combination of the center of mass of the unloaded spherical DUT holder 126 and the center of mass of the satellite 146. The center of mass 156 of the loaded spherical DUT holder 140 is now generally displaced from the center of the sphere 155 by some unknown displacement vector 157 and hence there is a non-zero gravitational torque present, but this torque is generally different from the one present in the unloaded spherical DUT holder 120, because the DUT has been loaded into it.

Ideally, for the purpose of testing, the nanosatellite is inserted and fixed within the spherical support structure in such a way that the center of rotation of the spherical support structure coincides with the center of mass of the satellite. In theory, this would eliminate the gravitational torque, but in practice is quite difficult to accomplish. Instead, the practice in the industry is to place the satellite so that the center of mass is as close as possible to the rotational center and then use additional weights positioned within the spherical structure in three directions around the satellite, while their exact location relative to the nanosatellite can be finely adjusted using actuators. This system for adjustment and nulling of the gravitational torque is generally referred to as a dynamic mass balancing system. The purpose of the dynamic mass balancing system is to bring the center of mass of the spherical support structure loaded with the satellite to the same location as the geometric center of the spherical support structure (that is, the center of rotation). To reduce or fully eliminate gravitational torque one uses a set of orthogonally oriented sliding counterweights to offset the center of mass of the assembly 156 towards the center of rotation. The procedure to minimize or remove the gravitational torque is well known in the art. One example of such a procedure and control system is described in a publication by J. Kim titled "Automatic mass Balancing of Air-Bearing based Three-Axis Rotational Spacecraft Simulator" and published AIAA Journal of Guidance, Control, and Dynamics in 2009.

For the above-described reasons, achieving precision centering the satellite 152 within the spherical holder 140 is generally accomplished in two steps. In the first step, before the satellite has been inserted into spherical DUT holder 120, the location of the center of mass 146 of the satellite 130 is computed or independently measured. This information is used to determine the location within the spherical holder 120 where the satellite 130 should be mounted. The satellite 130 is then inserted and mounted at the predetermined location within the spherical holder 120 resulting in a loaded spherical DUT holder 140. As noted previously, the unloaded spherical DUT holder 120 has its own center of mass 126 and inserting the satellite 130 into the unloaded spherical DUT holder 120 will generally result in the location of the center of mass of the unloaded spherical DUT holder 120 with the satellite 130 displaced from the center of the sphere 155 of the spherical holder 140.

The non-zero weight of the loaded spherical DUT holder 140 and a non-zero displacement 157 between center of the spherical shape 155 and the center of mass of the assembly at 156 produces a gravitational torque. Inasmuch as the air bearing exhibits very low friction, left alone, the gravitational torque will rotate the loaded spherical DUT holder 140 to the position of minimum energy. This gravitational torque is undesirable because it means that the ADCS within the satellite 130 embedded within the loaded spherical DUT holder 140 is forced to surmount a torque vector which is not present in space conditions. To eliminate or minimize this problem we require the second step to make a fine correction.

In the second step, the loaded spherical DUT holder 140 is tested for gravitational torque and the three adjustable weight-centering modules are used to move the center of mass 156 of the loaded spherical DUT holder 140 to coincide with the center of the sphere 155 of the spherical holder 140. Once this is done, the gravitational torque is substantially removed from the testbed.

There are three unknown moments of inertia of the loaded spherical DUT holder 140, $I_x$, $I_y$, and $I_z$, one in each of the three orthogonal directions x, y, and z. The addition of external weights and control electronics into the spherical support structure increases each of the three moments of inertia of the structure. The drawback of this addition lies with the fact that it is the satellite ADCS system under test must now control the attitude of a system that has larger moment of inertia that it would normally have to control if it were in space. The increase the moment of inertia of the entire assembly (satellite plus the testbed) may cause significant deviation of the spacecraft dynamics in laboratory conditions from the true behavior in orbit. The conventional approach to resolving this problem is to minimize the added moment of inertia by using lighter components and placing them as close as possible to the center of the sphere and finally building the spherical support structure out of a light material—plastic spherical housing that could be 3D-printed. The consequence of this phenomenon is that the optimization of the control algorithms becomes difficult and may lead to suboptimal attitude control. In other words, neither adjusting the center of mass nor lighter testbed components can compensate for the added moment of inertia. The downside of this phenomenon is that the ADCS dynamic cannot be fully tested in laboratory conditions prior to launch, which may lead to suboptimal attitude control and insufficient precision in pointing cameras and antennas to their targets. The objective is to have the ADCS system to deal with only the moments of inertia of the satellite and not the moments of inertia of the testbed, namely, the added moments of inertia of the spherical DUT holder. The moments of inertia of the loaded testbed hence have a contribution from the moments of inertia of the spherical DUT holder and it is this contribution that causes the problem for the satellite's ADCS system.

There have been attempts to minimize the added moment of inertia by means other than using lighter components. For example, in a publication by Irina Gavrilovich and coworkers titled "Test Bench for Nanosatellite Attitude Determination and Control System Ground Tests" and published in Proceedings of 4S: Small Satellites Systems and Services Symposium in 2014, and attempt is made to actively compensate the moment of inertia in one axis. Inertial compensation is based on an a priori knowledge of the device dynamics, namely, the moment of inertia of the satellite and torques produced by the satellite's actuators. Any deviation from the expected satellite dynamic caused by the testbed is detected through the measurement and dynamically corrected by an external actuator such as electric motor.

It is clear that there is a need in the industry for an improved system for characterization and testing of satellite ADCS systems in which the moment of inertia of testbeds is fully compensated and satellites can be tested as if they are in space. This application discusses a system and a method of improving systems for ADCS characterization.

BRIEF DESCRIPTION OF THE INVENTION

The present application discloses innovative devices and methods that are primarily focused on counteracting the effects of intrinsic mechanical characteristics of testbeds, where these effects would otherwise compromise the accuracy with which the performance of satellites, and in particular the ADCS systems of satellites, may be determined.

In one embodiment, a device referred to as a rotational negative-inertia converter (RNIC) compensates for the moments of inertia inevitably added by a testbed for spacecraft testing, as described above in the background section. A similar device that may be referred to as a linear negative-inertia converter (LNIC) may readily be envisaged for other applications where rotational inertia is not relevant while center of mass is, but details will not be discussed herein.

The application also describes two embodiments of a method to calibrate a testbed including the proposed RNIC, prior to the use of the testbed for satellite testing.

As described in the background, the elimination of the moments of inertia $I_x$, $I_y$, and $I_z$ of the testbed in the scenario when the satellite is placed into the spherical DUT holder is the last remaining issue to be removed to be able to present the satellite and the ADCS within the satellite with a testbed that ideally has no moment of inertia. One objective of this invention is to null the moments of inertia added by the spherical DUT holder by installing and operating RNIC modules within that holder. In a simple explanation, the RNIC has a flywheel in its interior that is powered by a motor, while its angular acceleration $\alpha_{fw}$ and angular velocity $\omega_{fw}$ are controlled with respect to the angular acceleration $\alpha_h$ and angular velocity $\omega_h$ of the RNIC housing relative to an inertial frame of reference via $\alpha_{fw}=k\alpha_h$, where the coefficient k is real predetermined number. The RNIC comprises a controller that uses a control loop to maintain the acceleration ratio k. All the rotation is assumed to be around a moment-compensating axis which is, aside from its weight, one of the mechanical characteristics of an RNIC.

To explain the principle of operation, we illustrate qualitatively some of the basic behavior of the RNIC. A torque vector T is a vector quantity defined as T=r×F, where F is the force vector and r is the radius vector over which the force on the RNIC is applied (distance from the moment-compensating axis and the point where the force is applied).

Figure 3:
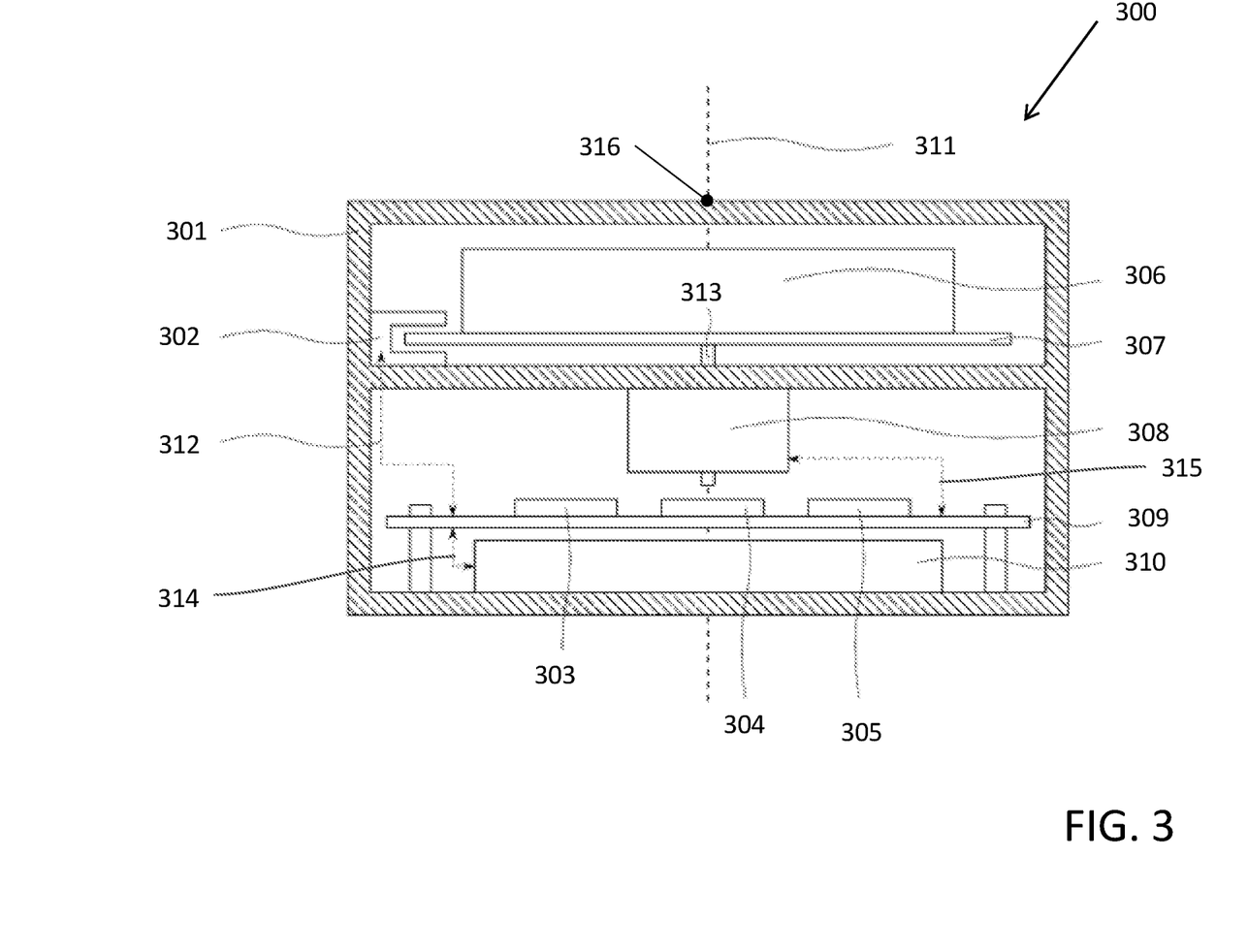
FIG. 3 illustrates an RNIC according to one embodiment.

Applying torque T to a body that can rotate changes its angular momentum L: dL/dt=T. Note that the angular momentum of a rigid body is given by the product L=Iω, where ω the angular velocity (vector) which is pointing in a direction that is perpendicular to the plane within which the rotation happens and the direction is defined with the vector product r×v, where v is the velocity (vector) of a point on the radius vector r at the perimeter of the rigid body. Furthermore, $I_\omega$ is the moment of inertia (scalar) of the rigid body computed for the axis of rotation coinciding with vector ω. We consider three basic behavior options while RNIC 300 is assumed to be suspended space (weightless condition).

Case A. The controller is off and an external observer applies a torque T onto the RNIC relative to the moment-compensating axis defined with radius vector r. The observer expects the angular velocity of the housing $\omega_h$ to increase in the direction forced by the torque T. The external observer exerting the torque should feel a resistance of the body to the application of the torque. The resistance comes from the fact that exertion of the torque must change the angular momentum of the body, via relationship I·dω/dt=T.

Case B. Suppose now that the controller is on and the feedback loop is operational. The proportionality coefficient k is positive and maintained at a predetermined value. When the external observer exerts same torque T as in case A, the housing will start accelerating with angular acceleration $\alpha_h$. This causes the flywheel to accelerate with angular acceleration $\alpha_{fw}$, relative to the housing. The flywheel rotation happens in the same direction as the housing because the proportionality coefficient is positive. The resistance to the torque the observer will feel now is larger than when it was when the RNIC was off, because for the same torque there is a larger change of the angular momentum.

Case C. Suppose now that the controller is on and that the proportionality coefficient k is maintained at a negative predetermined value. When the external observer exerts the same torque T as in cases A and B, the housing will again start accelerating with angular acceleration $\alpha_h$. This causes the flywheel to accelerate with angular acceleration $\alpha_{fw}$, in the opposite direction thereby reducing the angular momentum seen by the observer. The resistance to the torque the observer will be feeling is now lower than it would be when the RNIC was off, because for each torque application the resistance will be reduced by the higher angular velocity pushed onto the flywheel in the opposite direction.

Finally, if the observer perceives the RNIC as a black box without any knowledge of its contents, the observer will conclude that the RNIC has a moment of inertia that is smaller than when the RNIC controller was off. This effectively illustrates the contribution of the RNIC as the moment of inertia compensation by apparent negative moment of inertia achievable with proper control realized using the controller 308.

In one embodiment, this application discloses the design of RNIC apparatus and in another embodiment a method to adjust the control parameters of the RNIC to exactly compensate the moments of inertia of the unloaded spherical DUT holder.

The surplus moment of inertia of an ADCS testbed arising from the added weight and moments of inertia is detrimental to the accuracy of the ADCS testing. It is advantageous to install at least one, but preferably, three RNIC modules. Each module compensates for the moment of inertia in one of three orthogonal axes of an ADCS testbed.

The proposed NICs find their applications in reduction of an object's inertia. Implementing three orthogonally oriented RNICs can be used to fully eliminate moment of inertia introduced by the ADCS testbed and its components. Consequently, the moment of inertia of the whole verification setup becomes equal to the device under test itself.

Furthermore, the negative-inertia concept can be employed for the compensation of mass in systems where this is required in systems involving just linear motion. For linear motion in one dimension, a single linear negative-inertia converter (LNIC) analogous to the RNIC described above may be used, while in systems that need two dimensional and three-dimensional linear motion, three LNICs can be used.

This application refers to aerostatic bearings, but the inventive concepts may be used in systems employing aerodynamic bearings without departing from the spirit of the invention.

DESCRIPTIONS OF THE FIGURES

The accompanying drawings are not necessarily drawn to scale.

DETAILED DESCRIPTION OF THE INVENTION

Various embodiments of the present invention will now be described more fully with reference to the accompanying figures, in which some, but not all embodiments of the inventions are shown. These inventions may be embodied in many different forms and should not be construed as limited to the embodiments set forth herein.

Embodiment 1: RNIC

FIG. 3 illustrates a non-limiting example of an embodiment of a rotation negative-inertia converter 300 ("RNIC") having a moment-compensating axis 311 and comprising a housing 301, a motor 308 attached to housing 301 and operatively configured to actuate (rotate) a motor shaft 313, the motor shaft 313 has an axis of rotation that coincides with the moment compensating axis 311, a flywheel 306 and a encoder disk 307, both attached to the motor shaft 313 and operatively configured to rotate the shaft 313 around the moment compensating axis 311 when powered by the motor 308. The RNIC 300 further comprises a controller 304, a housing gyroscope 303, and a wireless transceiver 305 all disposed on a printed circuit board 309 and all being mutually electrically connected through electrical connections within the printer circuit board 309 which in turn is connected to the power source 310 via electrical connection 314. The motor 308 is electrically connected to the printer circuit board via connection 315. A quadrature optical encoder 302 attached to housing 301 is operatively configured to sense the rotation of encoder disk 307 relative to housing 301 and is electrically coupled to controller 304 via electrical connection 312. Housing gyroscope 303 is operatively configured to sense rotation of housing 301 relative to an inertial frame of reference. An inertial frame of reference is a frame of reference not undergoing acceleration. In other words, an inertial frame of reference for a physical object with zero net force acting on it moves with a constant velocity and the velocity may be zero. The RNIC 300 has a dimensional reference point 316, a point of reference for installing the RNIC and the point through which the axis of rotation passes. The reference point 316 is needed to be able to determine the distance between the RNIC 500 and other elements in the spherical DUT holder.

The elements of the RNIC 300 that are operatively configured to rotate, meaning the flywheel 306, encoder disk 307, motor shaft 313 and the rotor (rotating part) (not shown in FIG. 3) of the motor 308, are jointly referred to as the rotatable part of the RNIC 300 as they measurably contribute to the mechanics of motion of the RNIC 300. The rest of the RNIC is referred to as the fixed part of the RNIC, the fixed part also includes elements of the RNIC 300 that may be moveable, but their movement contributes negligibly to the mechanics of the RNIC. An example of an element whose mechanical movement is assumed to make negligible contribution to the mechanics of the RNIC is a gyroscope.

The angular velocity $\omega_h$ and acceleration $a_h$ of the housing relative to an inertial frame of reference is measured using housing gyroscope 303 rigidly attached to the housing 301 via the printed circuit board 309. The encoder-based rotational sensor ("EBR sensor"), comprising the encoder disk 307, optical encoder 302 and controller 304 is used for measuring the angular velocity $\omega_{fw}$ and acceleration $\alpha_{fw}$ of the flywheel 306 relative to the housing 301. Data from both sensors are delivered to the controller 304 and the controller 304 is operatively configured to use the angular velocity $\omega_h$ of housing rotation relative to an inertial frame and the angular velocity $\omega_{fw}$ of flywheel rotation relative to housing 301 as feedback to maintain the ratio k of angular velocities $\omega_{fw}=k\cdot\omega_h$ and angular acceleration $\alpha_{fw}=k\cdot\alpha_h$ to a predetermined value, where the coefficient k is a predetermined parameter that is input to the controller. The control is achieved using a feedback control algorithm (such as PID controller) digitally implemented within the controller 304. Note that because the coefficient k represents the ratio between the flywheel and housing angular accelerations, it must also represent the ratio between the angular velocities of the flywheel and the housing. It is clear that by adjusting the ratio k, one can compensate for the spherical DUT holder moment of inertia. The ultimate goal of this control is to free the satellite ADCS from having to exert torque in order to rotate the spherical DUT holder on the test bed. In a sense, the testbed itself exerts the required torque using the RNIC.

Therefore, judging by the torque an observer sees as having to be applied, the effective moment of inertia of the RNIC $I_{eff}$ is the sum of the moment of inertia $I_h$ of the housing 310 and the apparent moment of inertia of the rotating flywheel 306, which is the sum of its intrinsic moment of inertia $I_{fw}$ and the additional moment of inertia $kI_{fw}$ imposed due to the feedback imposed by the controller. Hence, $I_{eff}=I_h+(k+1)I_{fw}$. The flywheel 306, rotor of the motor 308, motor shaft 313 and encoder disc 302 contribute to $I_{fw}$, while all other parts of the device contribute to $I_h$. Moments of inertia $I_{fw}$ and $I_h$ are constant and do not change during the operation of the device, but the proportionality coefficient k is adjustable and is the controlling parameter. The constant k can be positive, zero or negative, and it is arbitrarily chosen by a user to achieve the desired effective moment of inertia of the system. If k<−1, the effective moment of inertia is less than the moment of inertia of the housing 301. The effective moment of inertia may even become negative for lower values of k. The chosen value of k is implemented as a part of the control algorithm.

It is clear that, while selecting the proportionality coefficient k gives a certain freedom in mechanical control of the spherical holder and the device under test, the objective is to ensure that the moment of inertia $I_u$, of the unloaded spherical DUT holder is made negligible or zero relative to the moment of inertia of the satellite. This means that the moment of inertia in each axis must be adjusted so that $I_u=I_h+(k+1)I_{fw}$ equals zero. The only controllable factor in this equation is the gain coefficient k so an appropriate, predetermined value of k must be set into the RNIC controller. In this way, the RNIC can completely cancel the moment of inertia of the unloaded spherical DUT holder. Three RNICs allow this cancellation to be done in each of the three orthogonal axes.

An RNIC constructed according to the present invention is characterized by a moment compensating axis, which defines the direction and the line on the surface and body of the RNIC. The operation of RNIC is furthermore characterized by its gain coefficient k, which determines the amount of moment of inertia that RNIC will compensate. The coefficient is predetermined and is generally not changed during the operation, but in some embodiments may be altered without departing from the spirit of the invention.

In some embodiments the power source 310 is an inductively coupled transformer, an element of a wireless power system.

In some embodiments, the weight-centering module function is integrated into the RNIC by employing the flywheel as both the weight and a flywheel. This is realized by allowing the flywheel to move linearly along the axis of symmetry to be used in weight-centering, while simultaneously being allowed to rotate to be used in the inertial zeroing method.

Embodiment 2: ADCS Testbed

The purpose of an ADCS testbed is to emulate space conditions (primarily a frictionless and zero gravity environment) for optimization and verification of a satellite[1] ADCS system on the surface of Earth, prior to launching the system into orbit. In one embodiment, the ADCS testbed comprises at least one RNIC to compensate and eliminate the moment of inertia of the spherical DUT holder, when loaded with the satellite under test.

[1] The term satellite used in the remainder of this disclosure should be understood as a term of convenience, that may mean "nanosatellite" in some applications.

Figure 4:
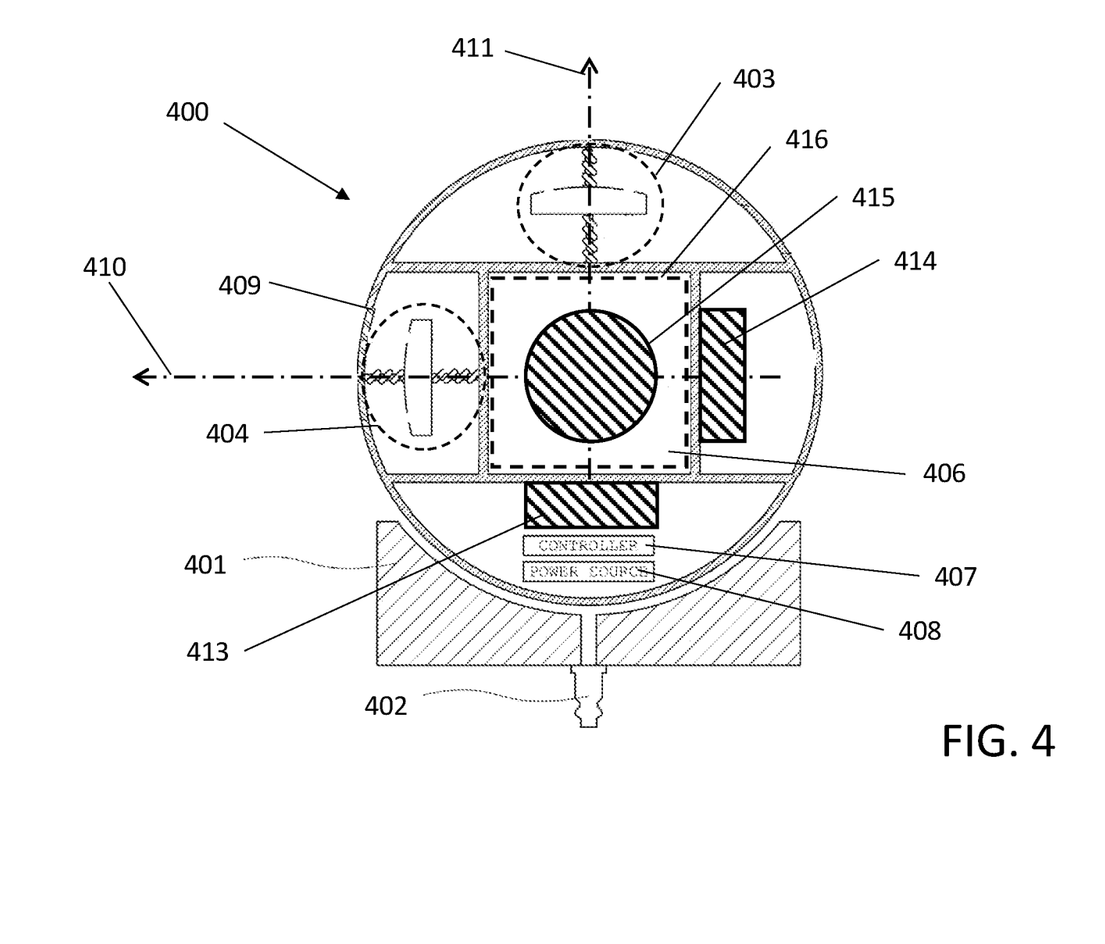
FIG. 4 illustrates a testbed for characterization of nanosatellite ADCS system employing three RNICs, according to one embodiment.

FIG. 4 illustrates a cross section view of one embodiment of a testbed 400 for testing the ADCS system of a nanosatellite according to the present invention. The testbed comprises a spherical air bearing base 401, which is powered by pressured air inserted through pneumatic inlet 402 (the compressed air is provided by a compressor which is not shown). The spherical DUT holder 409 allows complete freedom of rotation while inserted into the air bearing 401.

The spherical DUT holder 409 comprises an x-axis weight-centering module 404, a y-axis weight-centering module 403 and, not visible in the drawing since it is positioned behind the z-axis RNIC 415, a z-axis weight-centering module. The weight-centering modules are positioned along and define three orthogonal axes of the spherical DUT holder 409: the x-axis 410 and the y-axis 411 are visible and perpendicular to each other and lie in the plane of the paper, while z-axis is not shown but is perpendicular to the paper and points towards the reader, and passes through the intersection between the x-axis 410 and the y-axis 411. The spherical DUT holder 409 further comprises a controller 407, a power source 408 and a DUT space 406, which is prepared to fit a specific satellite format by design. Finally, the spherical DUT holder 409 is equipped with three RNICs, one for each of the three orthogonal axes: x-axis RNIC 414 positioned so that its axis of symmetry is parallel to and coincides with the x-axis 410. The y-axis RNIC 413 is positioned so that its axis of symmetry is parallel to and coincides with the y-axis 411, and finally, the z-axis RNIC 415 is positioned so that its axis of symmetry is parallel to and coincides with the z-axis (not shown).

In this application, the satellite under test, of an exemplary cubic shape, is placed prior to characterization into the DUT space 406 in the center of the spherical holder 409. In FIG. 4, a silhouette of the inserted satellite is shown by the dashed square 416. When the satellite (device under test) is not present in the DUT space 406, the ADCS testbed is referred to as "unloaded", while when the satellite is inserted into the DUT space 406 (as shown by 416), the testbed is referred to as "loaded".

When the satellite 416 is inserted into the spherical holder 409, an effort is made to ensure that the center of the mass (not shown) of the satellite 416 coincides with the center of the spherical holder 409. It is well known that designing a satellite with its center of mass at its geometrical center is uncommon and that some additional means are necessary to accomplish this. The centering of the center of mass requires moving the center of mass in three orthogonal directions and hence this is generally accomplished using three weight-centering modules provided for this purpose within the spherical holder 409. In FIG. 4, x-axis weight-centering module 404 and y-axis weight-centering module 403 are visible, while the z-axis weight-centering module is not visible because it is hidden behind the z-axis RNIC 415. Each of the weight-centering modules comprises a weight that can be moved along its respective axis using a linear actuator. All three weight-centering modules are electrically coupled to a controller 407.

Once the weight-centering has been completed, namely, gravitational torque has been substantially removed, the preferred ADCS testbed compensates for the moments of inertia added to the satellite 416 by the existence of the spherical DUT holder 409 which comprises three weight-centering modules and three RNICs. The RNICs are controlled with their respective coefficients k, which for three orthogonal axes are referred to as coefficients $k_x$, $k_y$, and $k_z$. With proper choice of values for these three coefficients inserted to the RNICs, as described above, the moments of inertia along three orthogonal axes $I_x$, $I_y$, and $I_z$ can all be substantially eliminated. In this way, the moments of inertia of the loaded spherical DUT holder 409 (with satellite 416) are substantially equal to the axis-respective moments of inertia of the satellite 416. Stated differently, the ADCS on-board the satellite is now subjected to moments of inertia that are substantially equal to those of the satellite alone, without the influence of the spherical DUT holder inertia.

The temporal transient in the operation of the RNICs within the testbed depend on the bandwidth of the control loops and the speed by which the ADCS on the satellite operates. In the present disclosure it is assumed that the RNICs respond to the slowly changing orientation of the satellite. If the rate of change is so fast that the RNIC controller lags behind, it may produce disturbance in the response. This effect can be substantially minimized by increasing the sampling rate or the rated power of RNIC motors. Because of that, the presented testbed can be easily scaled for larger satellites. Minimizing the moment of inertia of the testbed is no longer an issue since it can be reduced using RNICs.

Embodiment 3: Method for Calibration

In addition to the apparatuses disclosed in embodiments 1 and 2, we disclose a method for calibrating the ADCS testbed for both weight-centering and inertial zeroing. Calibrating the testbed for inertial zeroing amounts to determining the correct values of the coefficients $k_x$, $k_y$, and $k_z$, that result in eliminating the moments of inertia added to the satellite by placing the satellite within the spherical DUT holder.

Figure 5:
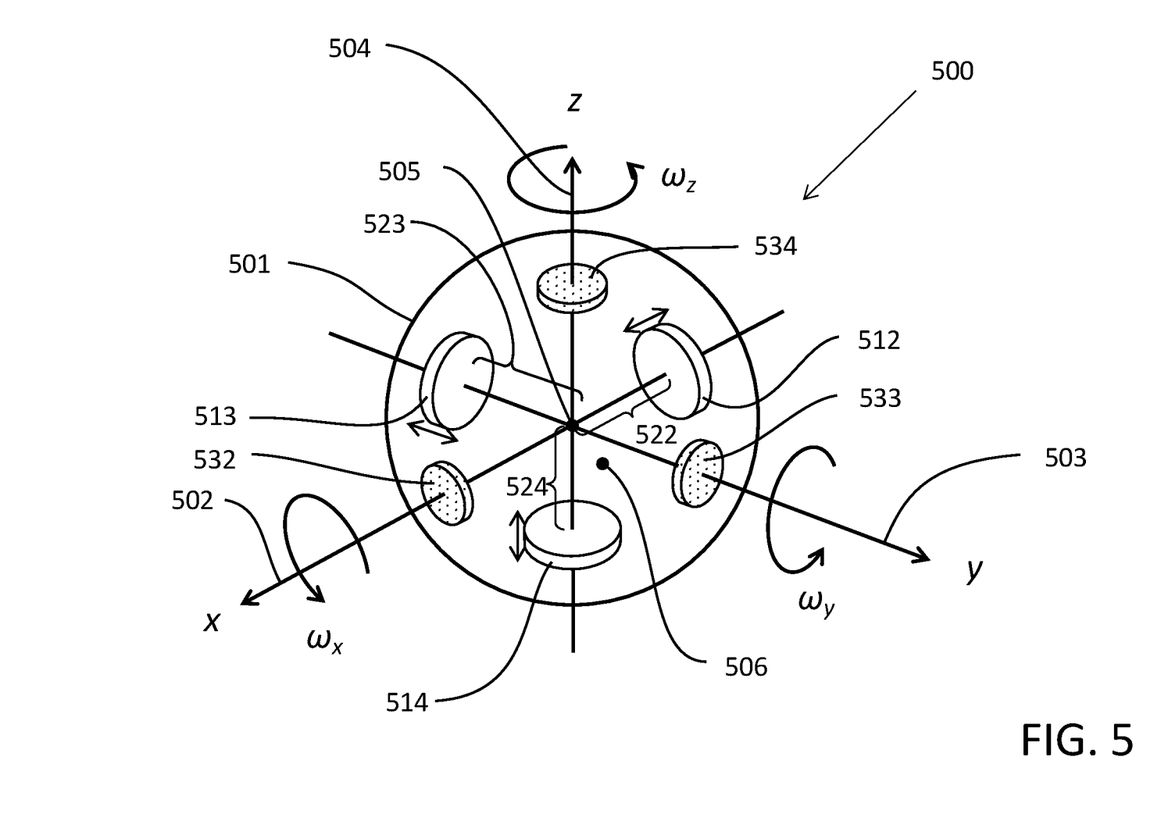
FIG. 5 is a pictorial view used to explain the procedure for calibration of an unloaded testbed according to one embodiment.

FIG. 5 illustrates a simplified pictorial view of an unloaded spherical DUT holder 500 having a smooth spherical surface 501 that enables the holder 500 to slide on an air bearing such as 401 shown in FIG. 4. The interior of the spherical DUT holder 500 is simplified to show only the elements that are actuated or relevant to the calibration method explained next.

To assist with the description, an orthogonal coordinate system is defined, consisting essentially of three orthogonal axes shown in FIG. 5 with x-axis 502, y-axis 503, and z-axis 504. The origin of the orthogonal coordinate system is defined as the intersection of the three orthogonal axes. The center 550 of the spherical shape 501 of the spherical DUT holder 500 coincides with the origin of the coordinate system.

Figure 6:
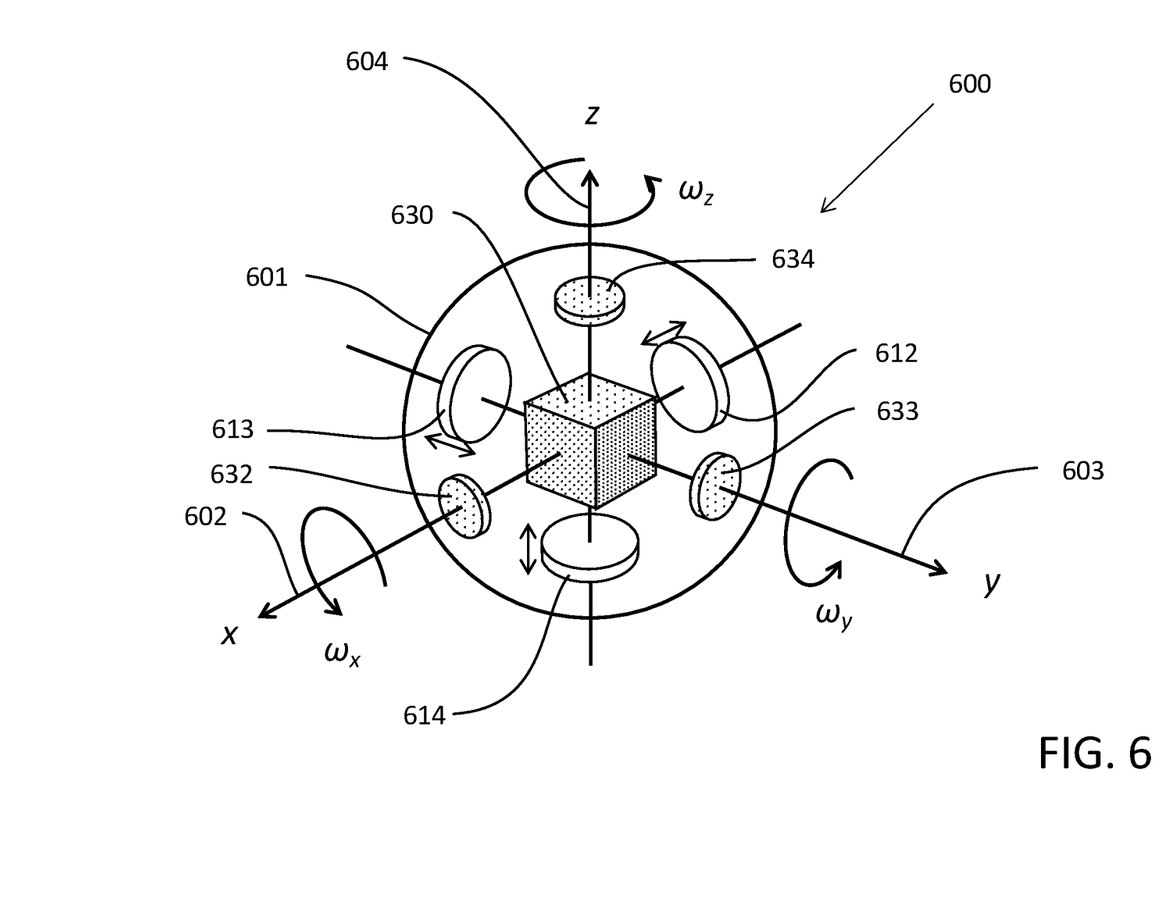
FIG. 6 is a pictorial view used to explain the procedure for calibration of one of the embodiments representing a loaded testbed according to one embodiment.
Figure 7:
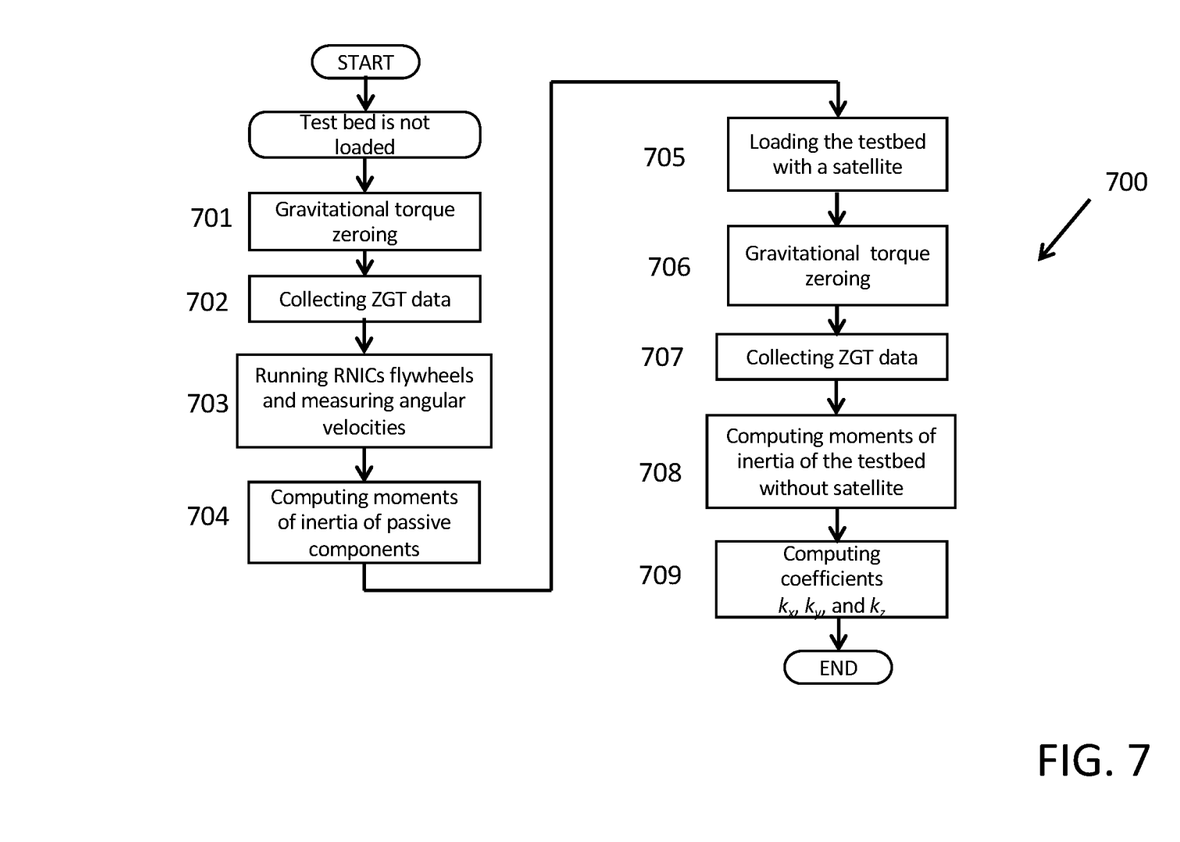
FIG. 7 illustrates a method for calibration of nanosatellite testbed employing three RNICs, according to one embodiment.

One embodiment of a method 700 to calibrate the testbed is disclosed with the help of FIG. 5, FIG. 6, and the flow diagram shown in FIG. 7. The method comprises two groups of steps. The first group of steps, up to and including step 704, is performed without the spherical DUT holder being loaded with the satellite (device under test) and the second group of tests, from step 705 through 709 in FIG. 7, is performed while a satellite is present within the spherical DUT holder.

It should be noted that during those calibration method steps in which the flywheels in the RNICs are switched on, they are operated "open-loop" i.e., with no feedback applied via any controllers.

The purpose of the calibration method disclosed below is to (i) determine testbed input parameters that substantially eliminate gravitational torque when a device under test is loaded and (ii) substantially eliminate the contribution of the moment of inertia of spherical DUT holder when a satellite is loaded by providing the coefficients $k_x$, $k_y$, and $k_z$ to the RNICs. The goal as discussed above is to prevent the satellite ADCS from being burdened by the moment of inertia added by the spherical DUT holder during the characterization of the performance of satellite's ADCS. Furthermore, the same setup can be used to determine the moment of inertia and the position of the center of mass of the device under test.

Step 701 in FIG. 7 achieves gravitational torque zeroing, as follows. In the unloaded spherical DUT holder 500, the center of mass 506 will generally be displaced from the center of the sphere 505 as seen in FIG. 5. The reason for this is that adjusting the location of all components within the unloaded spherical DUT holder 500 is never perfect. Once the unloaded spherical DUT holder 500 is placed onto the air bearing base (not shown in FIG. 5, but corresponding to 401 shown in FIG. 4) the product of the weight of unloaded spherical DUT holder 500 and the distance between the center of mass 506 and the center of the sphere 505 will produce a torque that will want to turn the spherical DUT Holder 500 towards a position of minimal potential energy, but without friction will keep on oscillating around the position of lowest potential energy. This added torque is referred to as gravitational torque and is undesirable because it adds additional torque that the satellite ADCS will have to correct for, which does not represent the reality the ADCS will face when the satellite is in orbit. A correction is needed to null this torque and is referred to as weight centering.

The fine correction of the displacement (distance between the center of mass 506 and center of sphere 505) is performed by using three weights (x-axis weight 512, y-axis weight 513, and z-axis weight 514) operatively configured to move parallel to their respective axes as is indicated by the straight double-headed arrows shown next to the weights. The mechanisms that move each of the weights are omitted from the drawing in FIG. 5 for simplicity, and because there are multiple ways to accomplish this task known in the art. The method for adjusting the center of mass comprises of shifting each of the weights along its respective axis until the center of mass 506 coincides with the center of sphere 505. This condition is referred to as "unloaded holder with zero gravitational torque". FIG. 5. illustrates the beginning of this method in which there is a displacement between center of mass 506 and the center of sphere 505. FIG. 5 does not show the end of the procedure.

At Step 702, the distances $a_x$, $a_y$, $a_z$, between three weights and the center of the sphere (shown in FIGS. 5 as 522, 523, and 524) are determined. The masses of the weights 512, 513, and 514, noted as $M_x$, $M_y$, $M_z$, respectively, are presumably known by design of the testbed. This collection of distance and mass data defines a zero gravitational torque ("ZGT") condition for unloaded testbed.

Before disclosing the method for inertial zeroing, it is important to describe the inertial changes that occur during the gravitational torque zeroing. This will be explained with the help of FIG. 5 for an example involving an x-axis weight. Consider the state in which all the weights (512, 513, and 514) are positioned at some arbitrary distances from the center of the sphere 505. These distances are referred to as $a_x$, $a_y$, and $a_z$, respectively, and shown in FIG. 5, labelled as 522, 523, and 524, respectively. We refer to this state as the initial condition and this condition is characterized by three spherical holder 500 moments of inertia: $I_x$, $I_y$, and $I_z$. Here $I_x$ is the moment of inertia of the unloaded spherical DUT holder 500 for rotation around x-axis 502, and the rest follow cyclically.

When the x-axis weight 512 is moved along the x-axis 502 by an amount equal to $d_x$ for the purpose of displacing the center of mass 506 of the spherical DUT holder 500 (during the gravitational torque zeroing), the moments of inertia $I_y$ and $I_z$ change, but ideally, the moment of inertia $I_x$ does not change. This is true when the x-axis of the coordinate system defining the spherical DUT holder passes through the center of mass of x-axis weight 512 as stated at the beginning of this method.

In other embodiments of weight-centering modules described in the literature such as "Automatic Mass Balancing of a Spacecraft Three-Axis Simulator: Analysis and Experimentation" written by Simone Chesi and coworkers and published in Journal of Guidance, Control, and Dynamics in 2014, the axes along which the balancing weight is actuated does not pass through the center of rotation (i.e. center of sphere 505). In such a scenario, moving any of the weights affects all three moment of inertia $I_x$, $I_y$, and $I_z$, and must be taken into account.

The inertial characteristics of q-axis weight (where q can be x, y, or z) are given by moments of inertia along three directions $I_{qx}$, $I_{qy}$, and $I_{qz}$. The moments of inertia are given for a weight-centered axis for each of the weights and axes. The components of the unloaded spherical DUT holder 500 can be divided into components that move to alter the holder's center of mass or alter its inertial properties, which we refer to as the active components, and the components or elements of components that do not move or rotate, which we shall refer to as passive/fixed elements.

To characterize the moment of inertia $I_x$ of unloaded spherical DUT holder 500 around x-axis 502, one considers the moment of inertia of passive components around x-axis 502 $I_{xo}$ and the contributions of active components at specified position after gravitational torque zeroing. x-axis weight 512, y-axis weight 513, and z-axis weight 514 contribute to $I_x$ with their inherent moments of inertia around x-axis 502 $I_{xx}$, $I_{yx}$, and $I_{zx}$, respectively. Additionally, y-axis weight 513, and z-axis weight 514 contribute to $I_x$ with additional inertia $M_y a_y^2$ and $M_z a_z^2$, respectively. This is a result of rotating y-axis weight 513, and z-axis weight 514 around x-axis 502, with their own centers of mass at the distance from x-axis 502 $a_y$ 523 and $a_z$ 524, respectively. Since the x-axis 502 passes through the center of mass of x-axis weight 512, the distance between the two is equal to zero ($a_x$=0). Thus, the term $M_x a_x^2$ is also equal to zero and does not contribute to $I_x$. Even though $M_x a_x^2$ does not contribute to $I_x$ in this embodiment, it is included in the equations below for the sake of generality. The same approach is applied to calculate contributions to the moments of inertia $I_y$ and $I_z$.

$$I_x = I_{xo} + I_{xx} + I_{yx} + I_{zx} + M_x a_x^2 + M_y a_y^2 + M_z a_z^2$$

$$I_y = I_{yo} + I_{xy} + I_{yy} + I_{zy} + M_x a_x^2 + M_y a_y^2 + M_z a_z^2$$

$$I_z = I_{zo} + I_{xz} + I_{yz} + I_{zz} + M_x a_x^2 + M_y a_y^2 + M_z a_z^2 \quad (A)$$

These expressions make use of the Parallel Axis Theorem, also referred to as the Huygens-Steiner Theorem or just Steiner Theorem, which tells how to compute the moment of inertia of a rigid body for rotation around an axis parallel to the axis through the center of mass, but at a passing through the rigid body at a distance equal to $a_x$, $a_y$, or $a_z$ in the above expressions. The description of this theorem can be found in textbooks on classical mechanics, such as, Classical Mechanics by Herbert Goldstein published by Addison-Wesley in 1980.

In one embodiment of the method to zero the inertial forces imposed on the satellite (DUT) by the holder, one must know the following physical parameters of the unloaded spherical DUT holder 500: mass of the each of the weights, the distance from the center of mass of each of the weights to the respective axis, and the moments of inertia of each of the weights around a weight-centered axis for each of the weights which passes through the center mass of the weight and coincides with the respective axis of the spherical DUT holder 500. The details of this are not described in connection with FIG. 5. The weights shown in FIG. 5, namely, x-axis weight 512, y-axis weight 512, and z-axis weight 514, are all illustratively depicted as circular disks and the coordinate axes 502, 503 and 504 of the spherical DUT holder 500 pass through the centers of these disks which is consistent with the above definition.

At this step the unknown variables in equations (A) are $I_x$, $I_y$, $I_z$, $I_{xo}$, $I_{yo}$, $I_{zo}$. In the next step of the method the moments of inertia $I_x$, $I_y$, $I_z$ are computed.

At Step 703, after ensuring that the flywheels within the RNICs and the unloaded spherical DUT holder are in the resting state, i.e., their angular velocities are equal to zero, the flywheels within the RNICs are turned on, either sequentially or simultaneously. When the x-axis RNIC gradually increases the angular velocity of its flywheel to a constant predetermined angular velocity $\omega_{xo}$ expressed in an inertial frame, the unloaded spherical DUT holder also accelerates, due to the conservation of angular momentum, and remains rotating at an angular velocity $\omega_{x1}$ assuming that there is no friction, or the friction is negligible. This angular velocity $\omega_{x1}$ is measured by the housing gyroscope in the RNICs, while the angular velocity $\omega_{xo}$ is calculated from the flywheel rotation sensor within the x-axis RNIC. Recall that the flywheel rotation sensor measures the angular velocity of the flywheel with respect to the reference frame fixed to the housing. Thus, to express the angular velocity of the flywheel in the inertial frame, one simply sums up the angular velocity measured by the gyroscope $\omega_{x1}$ and the angular velocity measured by the flywheel rotation sensor. This sum is the angular velocity $\omega_{xo}$.

At Step 704, from the known moment of inertia of the flywheel $I_{xfw}$ the moment of inertia $I_x$ of the unloaded spherical DUT holder is computed using the conservation of angular momentum principle: $I_{xfw}\omega_{xo}=I_x\omega_{x1}$. Notice that the ratio between the angular velocities is constant since it depends only on the ratio of $I_{xfw}$ to $I_x$ which does not change in time. The same procedure is repeated to calculate $I_y$ and $I_z$. At this point all three moments of inertia of the unloaded spherical DUT holder $I_x$, $I_y$, and $I_z$ are known and the only remaining unknowns $I_{xo}$, $I_{yo}$, and $I_{zo}$ (the moments of inertia of the passive/fixed components of the spherical DUT holder) can be calculated from equations (A), shown above. Note that the passive/fixed section of the unloaded spherical DUT holder is identical to the passive/fixed section of the loaded spherical DUT holder because no part of the inserted satellite adds to the passive/fixed section of the spherical DUT holder.

At Step 705, a device under test (a satellite) is loaded into the spherical DUT holder, using any of various well-known methods for doing so. At this point the spherical holder is referred to as a loaded spherical DUT holder.

FIG. 6 illustrates a simplified view of a loaded spherical DUT holder 600, having a smooth spherical surface 601 that enables the holder 600 to slide on an air bearing like bearing 401 shown in FIG. 4. The interior of the spherical DUT holder 600 is simplified to show only the elements that are actuated or relevant to the calibration method explained next.

To assist with the description, an orthogonal coordinate system is defined, consisting essentially of three orthogonal axes shown in FIG. 6 with x-axis 602, y-axis 603, and z-axis 604. The origin of the orthogonal coordinate system is defined as the intersection of the three orthogonal axes. The center of the sphere is not shown in FIG. 6. because it is obscured by satellite 630. The loaded spherical DUT holder 600 further comprises moveable weights—x-axis weight 612, y-axis weight 613, z-axis weight 614—and the axis-associated RNICs: x-axis RNIC 632, y-axis RNIC 633, and z-axis RNIC 634.

At Step 706, the gravitational torque zeroing process previously performed on the unloaded DUT holder is repeated, but this time with satellite 630 installed into the DUT space.

At Step 707, the ZGT data for the loaded testbed, i.e., the distances of the weights from the sphere center $b_x$, $b_y$, and $b_z$. are acquired. These distances are not indicated in FIG. 6., but they correspond to the distances 522, 523 and 524 shown in FIG. 5. Masses $M_x$, $M_y$, $M_z$ of the weights 612, 613, 614 remain unchanged.

At Step 708, the moment of inertia of the spherical DUT holder without the device under test (satellite) is computed, by summing up the previously computed moments of inertia of the passive components $I_{xo}$, $I_{yo}$, and $I_{zo}$, and of the active components from the acquired ZGT data in step 707, using the Parallel Axis Theorem.

$$I_x'=I_{xo}+I_{xx}+I_{yx}+I_{zx}+M_x b_x^2+M_y b_y^2+M_z b_z^2$$

$$I_y'=I_{yo}+I_{xy}+I_{yy}+I_{zy}+M_x b_x^2+M_y b_y^2+M_z b_z^2$$

$$I_z'=I_{zo}+I_{xz}+I_{yz}+I_{zz}+M_x b_x^2+M_y b_y^2+M_z b_z^2 \quad (B)$$

At Step 709, the coefficients $k_x$, $k_y$, and $k_z$ required to ensure that the testbed inertia is eliminated or substantially reduced are computed. Recall that the effective inertia of the RNIC in the x-axis can be expressed as $I_{xeff}=I_x'+(k_x+1)I_{xfw}$. Requiring that $I_{xeff}=I_{yeff}=I_{zeff}=0$ leads to the equations (C)

$$0=I_x'+(k_x+1)I_{xfw}$$

$$0=I_y'+(k_y+1)I_{yfw}$$

$$0=I_z'+(k_z+1)I_{zfw} \quad (C)$$

Since all moments of inertia in equations {C} are previously calculated or known, the equations are solved for the coefficients $k_x$, $k_y$, and $k_z$. Having established these coefficients, their values may be set as predetermined parameters, programming them into the RNIC controllers (not shown in the figure), so that the satellite may henceforward be characterized in a testbed that has no moment of inertia added by the spherical DUT holder and other testbed components.

One of the important advantages of the presented method for calibrating of the testbed is that it does not presume any knowledge of the mechanical properties of the satellite under test, specifically, the moments of inertia and the position of its own center of mass. However, the same setup could be used to extract the same mechanical properties of the satellite, as will now be described.

Embodiment 4: Method for Extraction of Mechanical Properties of the Satellite

Figure 8:
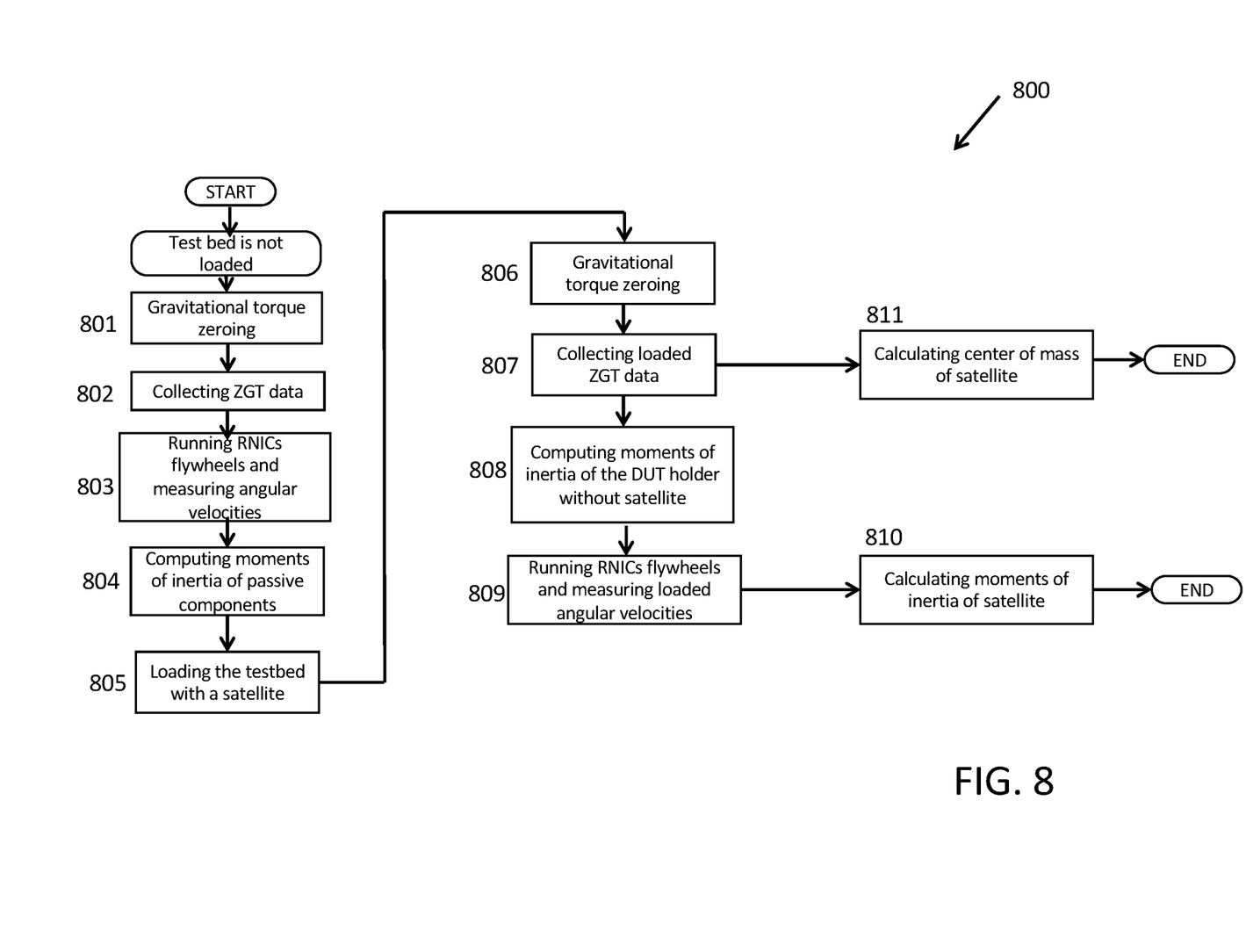
FIG. 8 illustrates the method of FIG. 7, with additional steps for the extraction of mechanical properties of nanosatellite, according to one embodiment.

In addition to the method for calibration just described, we disclose a method 800 in FIG. 8 for the extraction of mechanical properties of the satellite, namely the position of its center of mass and its own moments of inertia. It is assumed that the mass of the unloaded spherical DUT holder $M_{uh}$ and mass of the satellite $M_s$ are known.

Steps 801 through 808 in FIG. 8 are identical to steps 701 through 708 described above in detail with respect to FIG. 7, so the content will not be repeated here. In brief, in steps 801-804, for the unloaded testbed, gravitational torque centering is followed by computation of moments of inertia of passive components of the DUT holder. Next, in steps 805-808 with the satellite in place, gravitational torque centering is re-established, and total moments of inertia of the DUT holder are computed. As in the case of method 700, it should be noted that during those calibration method steps in which the flywheels in the RNICs are switched on, they are operated "open-loop" i.e. with no feedback applied via any controllers.

At Step 809, after ensuring that the flywheels within the RNICs and the loaded spherical DUT holder are in the resting state, i.e., their angular velocities are equal to zero. Then the flywheels within the RNICs are turned on, either sequentially or simultaneously. When the x-axis RNIC gradually increases the angular velocity of its flywheel to a constant predetermined angular velocity $\omega_{xo}$ expressed in inertial frame, due to the conservation of angular momentum, the loaded spherical DUT holder also accelerates and remains rotating at an angular velocity $\omega_{x2}$ assuming that there is no friction, or the friction is negligible. This angular velocity is measured by the housing gyroscope in the RNICs, while the frequency $\omega_{xo}$ is calculated from the flywheel rotation sensor within the x-axis RNIC. Recall that the flywheel rotation sensor measures the angular velocity of the flywheel with respect to the reference frame fixed to the housing. Thus, to express the angular velocity of the flywheel in the inertial frame, one simply sums up the angular velocity measured by the gyroscope $\omega_{x2}$ and the angular velocity measured by the flywheel rotation sensor. This sum represents the angular velocity $\omega_{xo}$. From the known moment of inertia of the flywheel $I_{xfw}$, compute the moment of inertia $I_x''$ of the loaded spherical DUT holder from conservation of angular momentum principle: $I_{xfw}\omega_{xo}=I_x''\omega_{x2}$. Notice that the ratio between the angular velocities is constant since it depends only on the ratio of $I_{xfw}$ to $I_x''$ which does not change in time. The same procedure is repeated to calculate $I_y''$ and $I_z''$.

Step 810. Subtract the moments of inertia of the spherical DUT holder without the device under test testbed $I_x'$, $I_y''$, and $I_z'$ from the computed moments of inertia of the loaded spherical DUT holder $I_x''$, $I_y''$, and $I_z'$ to obtain the moments of inertia of the satellite $I_{xs}$, $I_{ys}$ and $I_{zs}$, around x-axis, y-axis, and z-axis, respectively.

$$I_{xs}=I_x''-I_x'$$

$$I_{ys}=I_y''-I_y'$$

$$I_{ys}=I_y''-I_y' \qquad (E)$$

At Step 811, to determine the position of the center of mass of the device under test (satellite), the distances of the weights from the sphere center of the unloaded spherical DUT holder $a_x$, $a_y$, and $a_z$, are compared with those of the loaded spherical DUT holder $b_x$, $b_y$, and $b_z z$. The position of the center of mass of the satellite with respect to the center of the sphere is given by $c_x$, $c_y$, and $c_z$, in the direction of x-axis, y-axis, and z-axis, respectively, where:

$$c_x=M_x(a_x/M_{uh}-b_x)/M_s$$

$$c_y=M_y(a_y/M_{uh}-b_y)/M_s$$

$$c_z=M_z(a_z/M_{uh}-b_z)/M_s \qquad (D)$$

The equations (D) are derived using the definition of the center of mass for a system of particles.

A primary benefit of embodiments of the present invention discussed in this disclosure is the ability to test the performance of small satellites more accurately and realistically than hitherto possible. Indeed, small satellites are prone to minute disturbances, and the example testing systems described herein are designed to measure these minute disturbances. Moreover, they render the issues associated with miniature mass balancing systems and attitude feedback devices practically irrelevant.

Aspects of the invention discussed herein may be applied to compensate for moments of inertia not only of testbeds used to assess performance of ACDS systems of satellites, but of systems or devices with no connection to ACDS or satellite control at all. Moreover, they may be applied to systems with just a single or two degrees of rotational freedom. Such "1-D" and "2-D" systems are restricted to rotate only around one axis (e.g., any structure mounted on a shaft) or around two axes lying in a plane, respectively. If such a "1-D" system has a center of mass that does not lie on the axis of rotation, it vibrates while rotating. Similarly, the center of mass of the "2-D" systems must lie at the line that passes through the intersection of the axes of rotation and is orthogonal to the plane containing the two axes of rotation. A different kind of method than those described above may be used to translate the center of mass to the desired location. However, if there is a need to compensate for excessive moment of inertia (either due to the center-of-mass-centering system or for any other reason), the same kind of RNIC described for the "3-D" cases considered above can be used.

Many modifications and other embodiments of the inventions set forth herein will come to mind to one skilled in the art to which these inventions pertain, having the benefit of the teachings presented in the foregoing descriptions and the associated drawings. Therefore, it is to be understood that the inventions are not to be limited to the specific embodiments disclosed and that modifications and other embodiments are intended to be included within the scope of the appended inventive concepts. Although specific terms are employed herein, they are used in a generic and descriptive sense only and not for purposes of limitation.

We claim:

1. A satellite test system providing compensation for excessive moment of inertia, the satellite test system comprising:
   an air bearing base; and
   a device under test (DUT) holder operatively configured to float on the air bearing and contain a device under test, the device being a satellite;
   wherein the DUT holder comprises at least one rotational negative-inertia converter (RNIC), the RNIC comprising:
   a flywheel having an axis of symmetry, the flywheel being operatively configured to rotate within the RNIC around the axis of symmetry;
   a first motor having a stator and a rotor, the stator attached to the DUT holder and the rotor attached to said flywheel, operatively configured to rotate the flywheel in any direction around the axis of symmetry;
   a DUT holder angular accelerometer attached to the DUT holder, providing a DUT holder angular acceleration value around the axis of symmetry;
   a flywheel angular accelerometer providing a flywheel angular acceleration value; and
   a controller electrically coupled to the first motor, the DUT holder angular accelerometer, and the flywheel angular accelerometer;
   wherein the controller is operatively configured to drive the first motor to maintain the flywheel angular acceleration value proportional to the DUT holder angular acceleration value with a predetermined negative proportionality constant.

2. The satellite test system of claim 1,
   wherein the DUT holder contains three RNICs; and
   wherein the axes of symmetry of the three RNICs are mutually orthogonal.

3. The satellite test system of claim 1, wherein the axis of symmetry passes through a center of mass characterizing the RNIC.

4. The satellite test system of claim 1, wherein the predetermined proportionality constant is less than or equal to −1.

\* \* \* \* \*